*N. H. Borgfeldt.*

*Breaking Leaves of Tobacco.*

N° 94,565.   Patented Sep. 7, 1869.

Witnesses
C. Wahlers
E. F. Kastenhuber

Inventor
Nicholas H. Borgfeldt

United States Patent Office.

NICHOLAS H. BORGFELDT, OF NEW YORK, N. Y.

*Letters Patent No. 94,555, dated September 7, 1869.*

MACHINE FOR BREAKING THE LEAVES AND STEMS OF TOBACCO.

The Schedule referred to in these Letters Patent and making part of the same.

*To all whom it may concern:*

Be it known that I, NICHOLAS H. BORGFELDT, of the city, county, and State of New York, have invented a new and improved Machine for Breaking the Leaves and Stems of Tobacco; and I do hereby declare the following to be a full, clear, and exact description thereof, which will enable those skilled in the art to make and use the same, reference being had to the accompanying drawing, forming part of this specification, in which drawing—

Similar letters indicate corresponding parts.

Figure 1:
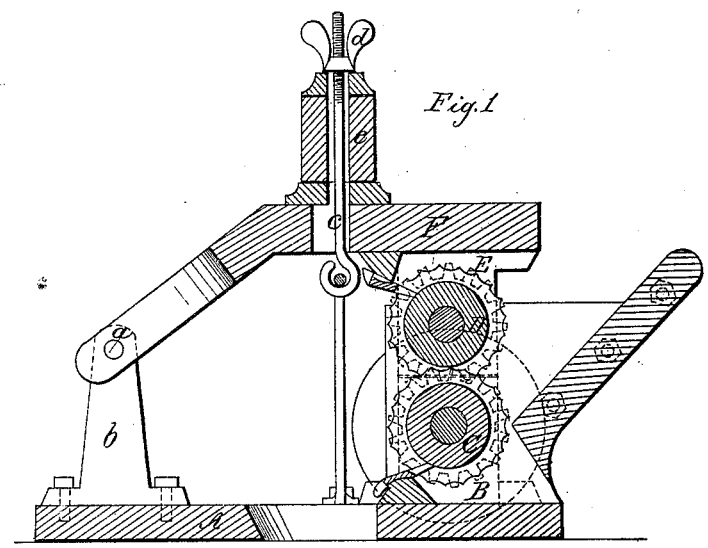
Figure 1 represents a longitudinal vertical section of this invention.
Figure 2:
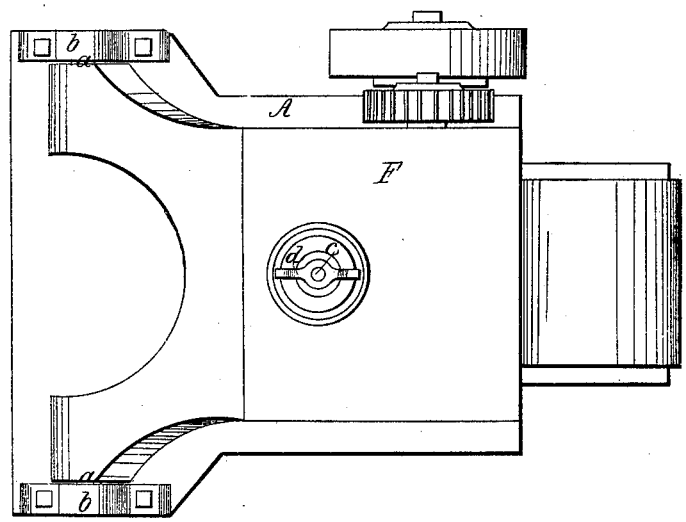
Figure 2 is a plan or top view thereof.

This invention relates to an improvement on a machine for breaking the leaves and stems of tobacco, for which Letters Patent were granted to me, September 10, 1867, No. 68,597.

My present invention consists in combining with one of the crushing-rollers a swinging frame having its bearings in standards which are further apart than the bearings of the crushing-rollers themselves, in such a manner that said crushing-rollers are prevented from moving away from each other further at one end than at the other, and thereby injury to their teeth is avoided.

The letter A designates a bed-plate, from which rise two standards B, which form the bearings for the lower crushing-roller C.

The upper crushing-roller D has its bearings in lugs E, projecting from the under surface of a hinged frame, F, which swings on gudgeons $a$, having their bearings in standards $b$, which rise from the bed-plate A.

The crushing-rollers C D are constructed with circular ridges and grooves, meshing into each other; and, if they work together, and are brought in an oblique or angular position toward each other by some hard substance passing through between them near to one of their ends, the ridges bind in the grooves, and are liable to be torn off.

This difficulty I have prevented by the hinged frame F, having its bearings in standards $b$, which are at a greater distance apart than the bearings of the rollers, which prevents the top roller from being tilted up at one end, and compels said roller to preserve its parallelism with the bottom roller, even if a nail or other hard substance gets between said rollers close at one of their ends.

The frame F is forced down by means of a screw, $c$, the nut $d$ of which bears upon an elastic cushion, $e$, so that the force by which the crushing-rollers are compressed can be regulated at pleasure, and, at the same time, said rollers preserve their quality to open and close parallel to each other.

I do not claim anything shown and described in my patent of September 10, 1867; but having thus described my invention,

What I claim as new, and desire to secure by Letters Patent, is—

The hinged frame F, in combination with the rollers C D, when the bearing-points of the frame are at a greater distance than the bearings of the rollers, substantially as described.

NICHOLAS H. BORGFELDT.

Witnesses:
W. HAUFF,
C. WAHLERS.